June 17, 1930.  W. C. JONES  1,763,891
SOUND RECORDING
Filed June 9, 1928

INVENTOR
WARREN C. JONES
BY
ATTORNEY

Patented June 17, 1930

1,763,891

UNITED STATES PATENT OFFICE

WARREN C. JONES, OF FLUSHING, NEW YORK, ASSIGNOR TO BELL TELEPHONE LABORATORIES, INCORPORATED, OF NEW YORK, N. Y., A CORPORATION OF NEW YORK

SOUND RECORDING

Application filed June 9, 1928. Serial No. 284,244.

This invention relates to recording devices and more particularly to means for damping phonograph recorders and the like.

It is the object of this invention to provide a simple, compact damping device of such a nature as to impart to the recorder a substantially uniform response characteristic over a wide range of frequencies.

In accordance therefore with the general features of this invention the recorder is provided with an oil-filled damping unit having a wing-like member adapted to oscillate between two adjustable plates in accordance with the movements of the recorder armature. The damping may be regulated by varying the spacing of the plates and the oil is confined without the introduction of any objectionable stiffness by means of a thin skin diaphragm attached to the wing member and clamped at its periphery to the unit casing.

Figure 1:
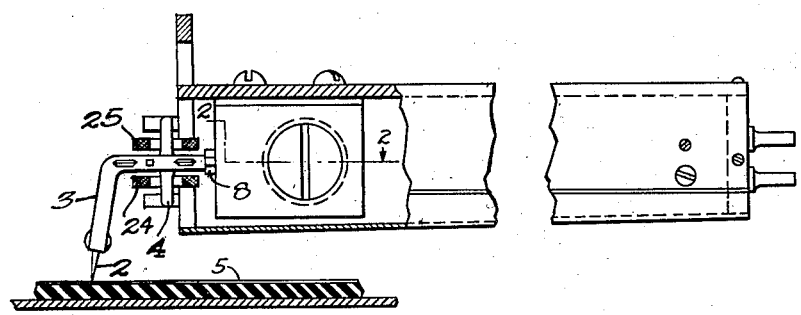
Figure 2:
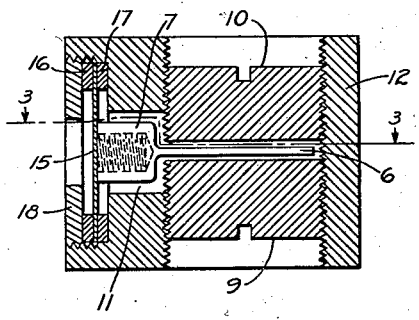
Figure 3:
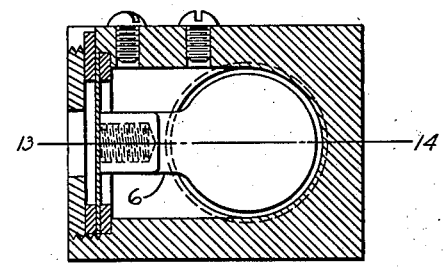

In the drawing Fig. 1 is a general view of one type of electrical recording device showing how the damping unit comprising this invention may be attached to damp the movements of the recording stylus. Figs. 2 and 3 are sectional views of the damping unit which clearly indicate the construction employed.

Referring now to Fig. 1, the recorder 1 is of the balanced armature type and with respect to the arrangement of the parts for translating electrical variations in the windings 24, 25 into mechanical vibrations of the recording stylus 2 is essentially the same as that disclosed in Patent 1,663,884 to Harrison. The recording stylus is carried by a stylus holder 3, the horizontal section of which serves also as a supporting member for the armature 4. When a record 5 is being cut an oscillatory motion is imparted to the armature by the interaction of the currents corresponding to the sounds to be recorded and the magnetic field of the recorder as fully described in the Harrison patent so that the stylus holder 3 will vibrate about its horizontal axis.

In order to obtain a reasonably uniform response over the desired frequency range it is usually necessary to provide such vibratory systems with some sort of terminating impedance for absorbing the energy not transmitted to the recording surface. Various methods accomplishing this result have been proposed but the device shown in Figs. 2 and 3 has proven very satisfactory particularly for high quality work in which it is necessary to maintain a uniform response throughout a wide range including the lower sound frequencies. In this device a winglike member 6 which is preferably of duralumin or other light, strong material, has a hollow cylindrical portion 7 which is threaded for easy attachment to the stylus holder of the recorder indicated in Fig. 1. The face plates 9 and 10 are slotted and threaded for convenience in adjusting the size of the damping chamber 11 in the casing 12. This chamber is filled with a heavy viscous material which impedes the motion of the wing member 6 as it vibrates about its axis 13 and 14 according to the movements of the stylus holder. A very thin flexible diaphragm 15 for confining the viscous material is held between rings 16 and 17 and clamped in place and protected from injury by the plug 18. A material suitable for this diaphragm is known as fish skin.

A central opening in the diaphragm is provided to permit the wing member 6 to be attached to the recorder and a lock nut 8 holds this member in proper alignment and prevents the escape of the viscous liquid at this point. Care should be taken in clamping the diaphragm in place to see that it is not stressed radially for in such a case the resulting stiffness would materially alter the characteristic of the recorder.

What is claimed is:

1. In a vibration damping device, a casing, a pair of spaced plates, a member adapted to oscillate between the plates and viscous matter in said casing to impede the oscillations of said member.

2. In a vibration damping device, a casing having a pair of closely spaced surfaces, a member adapted for rotary oscillatory vibration between the surfaces and viscous matter in the casing to resist the motion of said member.

3. In a vibration damping device, a casing having a pair of adjustably spaced plates, a wing-like member between the plates, viscous matter in the casing for impeding the motion of said member, and a thin flexible diaphragm attached to said member and said casing for confining the viscous matter.

In witness whereof, I hereunto subscribe my name this 8th day of June, 1928.

WARREN C. JONES.